United States Patent
Lee et al.

(10) Patent No.: US 7,655,890 B2
(45) Date of Patent: Feb. 2, 2010

(54) LIGHT SENSOR, DISPLAY APPARATUS INCLUDING THE SAME, AND CONTROL METHOD THEREOF

(75) Inventors: Joo-hyung Lee, Gwacheon-si (KR); Dong-jin Jeong, Seoul (KR); Man-seung Cho, Seoul (KR); Soon-dong Kim, Osan-si (KR); Jin-hee Lee, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 12/185,687

(22) Filed: Aug. 4, 2008

(65) Prior Publication Data

US 2009/0127432 A1    May 21, 2009

(30) Foreign Application Priority Data

Nov. 19, 2007    (KR) .................. 10-2007-0118071

(51) Int. Cl.
*G01J 1/32* (2006.01)
(52) U.S. Cl. .................. 250/205; 345/102; 315/154
(58) Field of Classification Search .................. 250/205; 345/102, 87, 89, 207; 315/154, 156, 307
See application file for complete search history.

(56) References Cited

U.S. PATENT DOCUMENTS

2005/0179682 A1    8/2005    Shin et al.
2007/0070007 A1    3/2007    Imai et al.

FOREIGN PATENT DOCUMENTS

| JP | 10-0500691 | 7/2005 |
|----|------------|--------|
| JP | 2006-091051 | 4/2006 |
| JP | 2006-330516 | 12/2006 |
| JP | 2007-052105 | 3/2007 |
| JP | 2007102025 | 4/2007 |
| KR | 1020050029918 | 3/2005 |
| KR | 10-0500691 | 7/2005 |
| KR | 1020050073869 | 7/2005 |
| KR | 1020050097289 | 10/2005 |
| KR | 1020060016230 | 2/2006 |
| KR | 1020060063399 | 6/2006 |

*Primary Examiner*—Seung C Sohn
(74) *Attorney, Agent, or Firm*—Innovation Counsel LLP

(57) ABSTRACT

There are provided a light sensor, a display apparatus including the same, and a control method thereof. The display apparatus includes: a display panel which includes a display area through which an image is displayed and a non-display area. A light receiving transistor which is formed in the non-display area and receives outside light. A charging part which includes a first terminal is connected to a drain electrode of the light receiving part and a second terminal is connected to a direct current voltage terminal. A signal amplifying part which includes a first terminal and a second terminal which is connected to a source of reference voltage and receives a reference voltage. A charging switching part is connected between the first input terminal and the first terminal of the charging part. A controller is provided which controls the charging switching part according to a predetermined first cycle to charge or discharge the charging part.

19 Claims, 10 Drawing Sheets

LIGHT SENSOR, DISPLAY APPARATUS INCLUDING THE SAME, AND CONTROL METHOD THEREOF

CROSS-REFERENCE TO RELATED APPLICATION

This application claims priority from Korean Patent Application No. 10-2007-0118071, filed on Nov. 19, 2007 in the Korean Intellectual Property Office, the disclosure of which is incorporated herein by reference.

BACKGROUND OF INVENTION

1. Field of Invention

Apparatuses and methods consistent with the present invention relate to a light sensor which senses light using a thin film transistor, a display apparatus including the same, and a control method for the display apparatus.

2. Description of Related Art

In general, in a display apparatus including an LCD panel or an organic light emitting display panel, the luminescence of the display panel is controlled by sensing outside light. If a display panel for a handheld terminal such as a mobile phone, a PDA or a game machine is used outside or in a dark place, the appearance of an image is changed by outside light, and thus, it is very important to sense outside light.

A thin film transistor in the display panel is generally employed as a light sensor. The light sensor senses the intensity of outside light using current output from the light sensor in response to the outside light.

In the case of such a thin film transistor, output current is significantly variable by voltage between a gate terminal and a source terminal, and voltage between the source terminal and a drain terminal is also unstable due to resistance connected to the source terminal. Due to such a characteristic of the thin film transistor, it is difficult to obtain a linear output from the light sensor if the intensity of light is very low or high.

Further, if a threshold voltage (Vth) of the thin film transistor is shifted due to deterioration of the thin film transistor, variability of the output voltage becomes larger.

SUMMARY OF INVENTION

Accordingly, it is an embodiment of the present invention to provide a light sensor which can provide a linear output in response to light, a display apparatus including the same, and a control method of the display apparatus.

Another embodiment of the present invention is to provide a light sensor which can provide a stable output irrespective of a change in characteristics of an element, a display apparatus including the same, and a control method of the display apparatus.

Still another embodiment of the present invention is to provide a light sensor which can provide a stable output without being affected by temperature, a display apparatus including the same, and a control method of the display apparatus.

Additional embodiments of the present invention will be set forth in part in the description which follows and, in part, will be obvious from the description, or may be learned by practice of the present invention.

The foregoing and/or other embodiments of the present invention can be achieved by providing a light sensor for use in a display apparatus, including: a light receiving transistor which receives outside light; a charging part which includes a first terminal connected to a drain electrode of the light receiving transistor and a second terminal connected to a direct current terminal; a signal amplifying part which includes a first input terminal and a second input terminal which is connected to a reference voltage supplying part; a charging switching part which is connected between the first input terminal and the first terminal of the charging part; and a controller which controls the charging switching part according to a predetermined first cycle to charge or discharge the charging part.

The light sensor may further include a reset switching part which includes a first terminal connected to the first input terminal and a second terminal connected to an output terminal of the signal amplifying part, and the controller may control the reset switching part according to a predetermined second cycle.

The light sensor may further include an output switching part which is connected to the output terminal, and the controller may control the output switching part in synchronization with turn-on of the reset switching part, and a turn-on time during which the output switching part is turned on may be longer than a turn-on time during which the reset switching part is turned on.

The charging switching part may be turned on after the reset switching part is turned off within the second cycle.

A turn-on time during which the charging switching part and the output switching part are simultaneously turned on may be shorter than a discharging time during which the charging switching part is turned off.

The first cycle may be the same as the second cycle, or shorter than the second cycle.

A voltage between a gate electrode and a source electrode of the light receiving transistor may be maintained constantly.

The direct current terminal may include a ground terminal.

The light sensor may further include a charging voltage supplying part which supplies a charging voltage of a predetermined level to the charging part.

If the level of the charging voltage is higher than that of the reference voltage, the direct current terminal may include a direct current voltage source which outputs a voltage corresponding to the level of the reference voltage.

The charging voltage supplying part may include a charging voltage source which outputs the charging voltage; and an auxiliary charging switching part which includes a first terminal connected to the charging voltage source and a second terminal connected between the charging part and the charging switching part.

The auxiliary charging switching part may be turned on after the charging switching part turned off within the first cycle.

The light sensor may further include a signal converting part which is connected to the output terminal of the signal amplifying part and converts an output signal outputted from the signal amplifying part into a digital signal.

The foregoing and/or other embodiments of the present invention can be also achieved by providing a display apparatus including: a display panel which includes a display area through which an image is displayed and a non-display area through which the image is not displayed; a light receiving transistor which is formed in the non-display area and receives outside light; a charging part which includes a first terminal connected to a drain electrode of the light receiving part and a second terminal connected to a direct current terminal; a signal amplifying part which includes a first terminal and a second terminal which is connected to a reference voltage supplying part and receives a reference voltage; a charging switching part which is connected between the first input terminal and the first terminal of the charging part; and a controller which controls the charging switching part according to a predetermined first cycle to charge or discharge the charging part.

The charging switching part may be formed on the display panel.

The display panel may include a first substrate, a second substrate which faces the first substrate, and a light blocking layer which is formed on at least one of the first substrate and the second substrate and blocks the outside light, and the display apparatus may further include: a dummy switching part which is formed on a branch between the first input terminal and the charging switching part; a dummy transistor which is formed below the light blocking layer and includes a drain electrode connected to the dummy switching part; and a dummy charging part which includes a first terminal connected to the drain electrode of the dummy transistor and a second terminal connected to a direct current terminal.

The display apparatus may further include an operation part which is provided at a node connected to the charging switching part, the dummy switching part and the first input terminal, and operates a difference between current outputted from the first input terminal and current inputted to the dummy switching part.

The foregoing and/or other embodiments of the present invention can be also achieved by providing a control method of a display apparatus which includes a display panel, including: providing a light receiving transistor in which a voltage between a gate electrode and a source electrode is constant and a charging part which includes a first terminal connected to a drain electrode of the light receiving transistor and a second terminal connected to a direct current terminal; supplying a predetermined charging voltage to charge the charging part; stopping the charging voltage supplying for a predetermined time so that electric charges in the charging part are discharged to the light receiving transistor; reading an output value corresponding to electric charges charged in the charging part while charging the charging part; and controlling the brightness of the display panel on the basis of the read output value.

BRIEF DESCRIPTION OF DRAWINGS

The above and/or other embodiments of the present invention will become apparent and more readily appreciated from the following description of the exemplary embodiments, taken in conjunction with the accompanying drawings, in which.

DETAILED DESCRIPTION OF EXEMPLARY EMBODIMENTS

Figure 1:
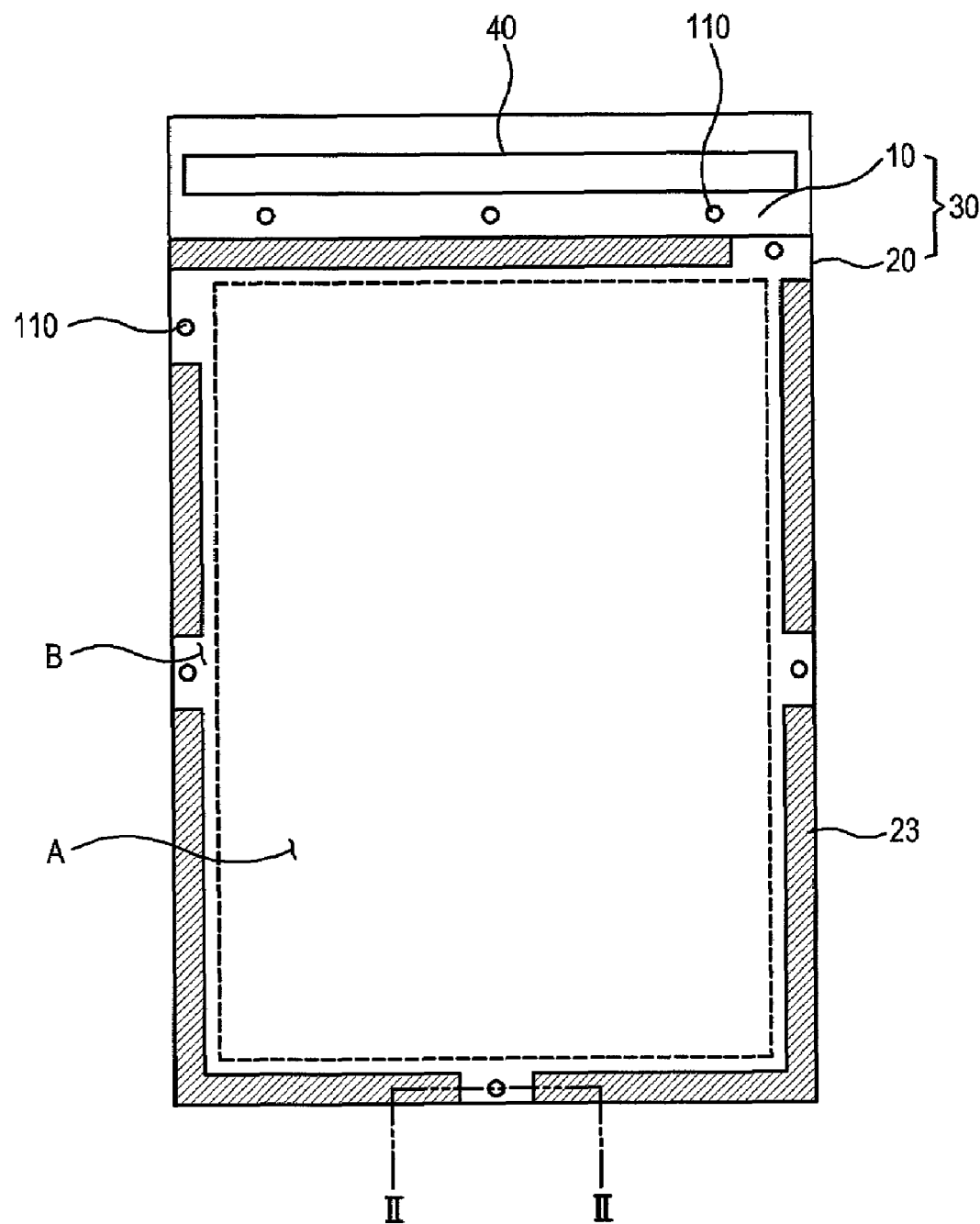
FIG. 1 is a plan view of a display apparatus according to a first exemplary embodiment of the present invention.

Reference is made below in detail to the embodiments of the present invention, examples of which are illustrated in the accompanying drawings, wherein like reference numerals refer to like elements throughout. Repetitive description to like elements is avoided. The exemplary embodiments are described below to explain the present invention by referring to the figures.

Figure 2:
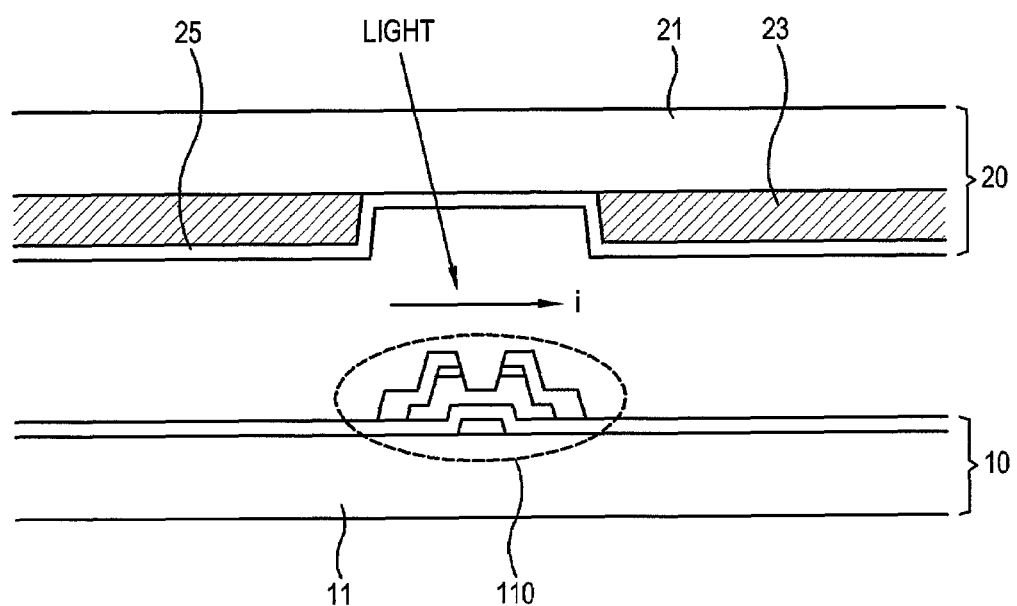
FIG. 2 is a sectional view taken along line II-II in FIG. 1.
Figure 3:
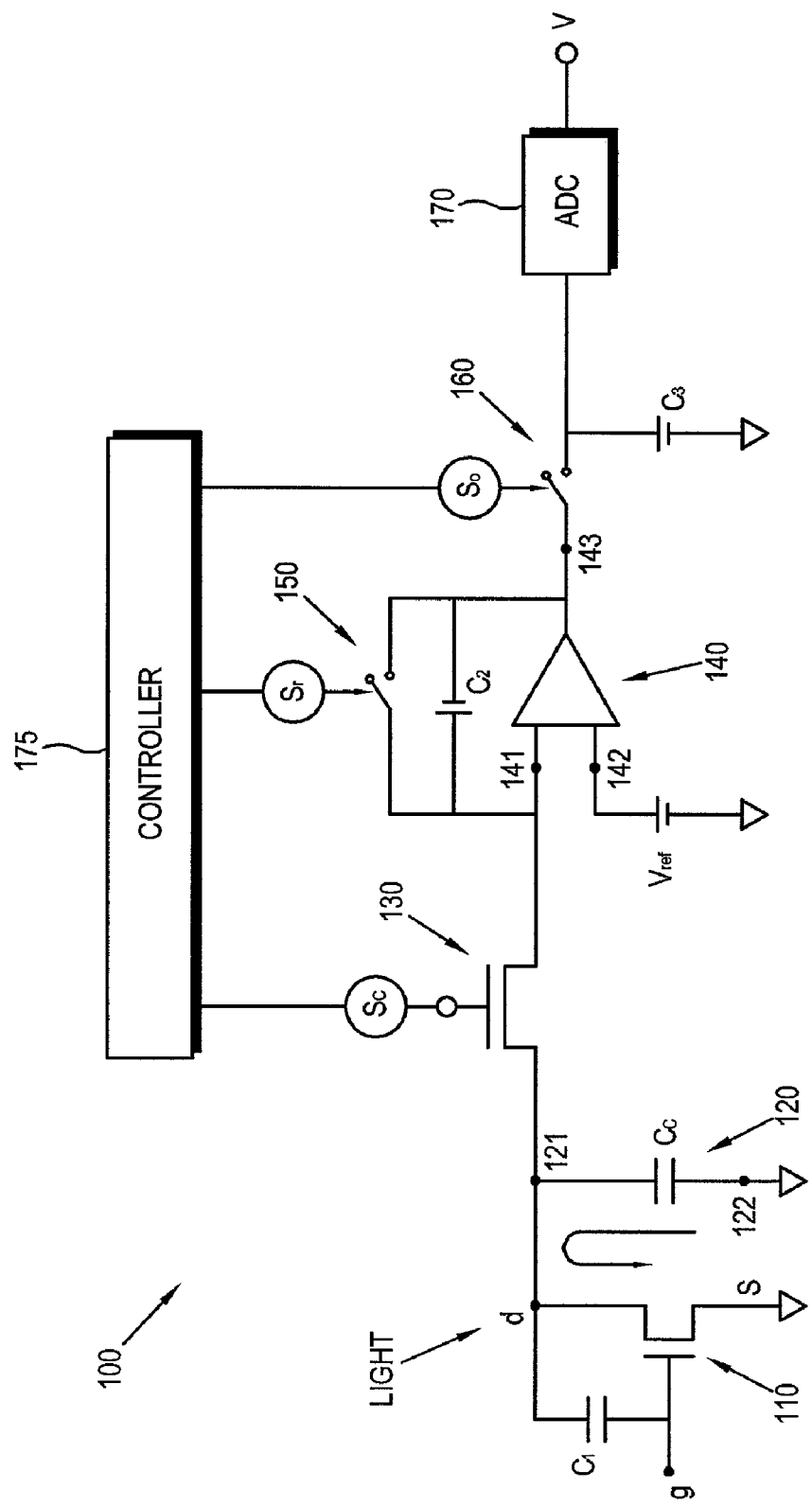
FIG. 3 is a circuit diagram of a light sensor according to the first exemplary embodiment of the present invention.

Referring to FIGS. 1 to 3, a display apparatus according to a first exemplary embodiment of the present invention includes a display panel 30 which includes a first substrate 10 and a second substrate 20; and a light sensor 100 which receives outside light and outputs voltage corresponding to the intensity of the outside light.

On the first substrate 10 is formed a plurality of pixels including thin film transistors; and on the second substrate 20 is formed a color filter layer (not shown).

The display panel 30 may be provided as an LCD panel including a liquid crystal layer or an organic light emitting diode panel including an organic light emitting layer. In the case of the LCD panel, the display apparatus further includes a back light unit which provides light to a rear of the display panel 30. Here, to provide light to the liquid crystal layer, a transmissive or a semi-transmissive method may be employed.

On the first substrate 10 is mounted a panel driving part 40 which generates various signals for controlling and driving the thin film transistor and applies the generated signals to the thin film transistor. The panel driving part 40 may be provided as a chip and then mounted on the first substrate 10, or may be formed on the first substrate 10 through the same process used to produce the thin film transistors. Between the panel driving part 40 and the plurality of pixels is formed a plurality of signal lines (not shown) for signal transmission.

The display panel 30 may include a display area A through which an image is displayed, and a non-display area B outside of the display area A. The pixels are formed in the display area A. In a part of the non-display area B a light blocking layer 23 is formed to block light; and in another part of the non-display area B is formed a light receiving transistor 110 to sense outside, externally generated light. As shown in FIG. 1, the light receiving transistor 110 may be formed in an area of the non-display area B in which the first and second substrates 10 and 20 are overlapped and in an area of the non-display area B in which only the first substrate 10 exists.

As shown in FIG. 2, the light receiving transistor 110 is formed on a first substrate member 11 forming the first substrate 10. The light blocking layer 23 is not formed above the light receiving transistor 110, and thus, the light receiving transistor 110 can receive external light. If light is received from the outside, a drain current i flows from a drain electrode to a source electrode in the light receiving transistor 110. The light receiving transistor 110 may have the same structure as the plurality of transistors (not shown) formed on the first substrate member 11, or alternatively, may be provided as a separate light receiving element and then mounted in the non-display area B. A predetermined level of voltage is applied to a gate electrode and a data electrode of the light receiving transistor 110.

The second substrate 20 includes the light blocking layer 23 formed on a second substrate member 21 and a common electrode layer 25 covering the light blocking layer 23. The light blocking layer 23 may be provided as a black matrix, or may be formed of a plurality of color filter layers. The light blocking layer 23 may be formed on the second substrate 20 as shown in FIG. 2, or alternatively, may be formed on the first substrate 10 on which the light receiving transistor 110 is formed.

If the light receiving transistor 110 is formed in the part of the non-display area B in which the first substrate 10 and the second substrate 20 do not overlap, the second substrate 20 does not cover the light receiving transistor 110.

Hereinafter, the light sensor 100 which includes the light receiving transistor 110 is described with reference to FIG. 3.

The light sensor 100 includes the light receiving transistor 110 which is formed on the first substrate 10; a charging part 120, which may be, for example, a capacitor; a charging switching part 130 which may be, for example a semiconductor switching device; a signal amplifying part 140; a reset switching part 150; an output switching part 160; a signal converting part 170 which is an analog to digital converter; and a controller 175 which controls the operation of the above components.

The light receiving transistor 110 has three control terminals including a gate electrode g, a drain electrode d and a source electrode s. Between the gate electrode g and the drain electrode d is connected a first capacitor C1. The first capacitor C1 charges voltage applied to the gate electrode g and discharges electric charges when the charging switching part 130 is turned off, which is the same function as the charging part 120. That is, the first capacitor C1 functions to support the function of the charging part 120. Instead of providing a discrete capacitor, first capacitor C1 may be the parasitic capacitance which exists between the gate electrode g and the drain electrode d. Due to characteristics of the transistor, current flowing from the drain electrode d to the source electrode s (hereinafter referred to as the drain current i) is affected by a voltage Vgs between the gate electrode g and the source electrode s, and a voltage Vds between the drain electrode d and the source electrode s. If the voltage Vgs between the gate electrode g and the source electrode s varies, the drain current i changes even under a constant luminescence of light, and thus, it is difficult to obtain a stable output value. Here, the output value indicates a final value corresponding to the drain current i varying according to the intensity of light. The output value may be represented in the unit of current or voltage.

To maintain the voltage Vgs between the gate electrode g and the source electrode s constant, both the gate electrode g and the source electrode s are connected to a DC voltage source (not shown).

The charging part 120 is generally provided as a capacitor Cc. A first terminal 121 of the charging part 120 is connected to the drain electrode d of the light receiving transistor 110; and a second terminal 122 thereof is connected to a ground terminal. Alternatively, the second terminal 122 of the charging part 120 may be connected to the reference voltage terminal of the source of DC voltage which applies the voltage of a certain level. The charging part 120 charges or discharges electric charges according to the charging switching part 130 to measure the drain current i of the light receiving transistor 110 in an indirect way; and buffers the drain current i so that the drain current i can be linearly outputted according to the luminescence of light.

Conventionally, if the luminescence of light is high, the drain current sharply increases; and if the luminescence is low, the change in the drain current is very small, which makes it difficult to measure the drain current according to the luminescence. However, according to the present invention, the first terminal 121 of the charging part 120 and the drain electrode d of the light receiving transistor 110 maintains the same voltage, and accordingly, the voltage Vds between the drain electrode d and the source electrode s varies according to voltage charged in the charging part 120, thereby controlling the drain current i.

The charging switching part 130 is connected between the first terminal 121 of the charging part 120 and a first input terminal 141 of the signal amplifying part 140, and is switched per a first cycle according to a charging control signal Sc outputted from the controller 175. If the charging switching part 130 is turned on, the charging part 120 accumulate an electrical charge; and if it is turned off, the charging part 120 discharges the electrical charge toward the light receiving transistor 110. The charging switching part 130 may be formed on the first substrate 10 together with the light receiving transistor 110, or alternatively, may be formed in a separate chip. The remaining elements of the light sensor 100 except the light receiving transistor 110 may be integrated into a chip.

The signal amplifying part 140 is provided as an operational amplifier which amplifies an electric signal, and includes the first input terminal 141 which is connected to the charging switching part 130, a second input terminal 142 which is connected to a reference voltage supplying part which supplies a reference voltage of a predetermined level. An output terminal 143 of the signal amplifying part 140 is connected to the output switching part 160. Between the first input terminal 141 and the output terminal 143 is connected a second capacitor C2 which determines a gain of an output signal.

The reset switching part 150 is provided in parallel with the second capacitor C2. The reset switching part 150 resets the second capacitor C2 and a third capacitor C3 to obtain a suitable output value corresponding to the drain current i. The controller 175 outputs a reset control signal Sr to the reset switching part 150; and the reset switching part 150 turns on and off per a second cycle according to the reset control signal Sr. The second cycle for switching the reset switching part 150 may be the same as or different from the first cycle for switching the charging switching part 130.

The output switching part 160 turns on in synchronization with turn-on of the reset switching part 150 according to an output control signal So, and is switched to read an output value according to luminescence. That is, if the output switching part 160 turns on, an output value Vout corresponding to the drain current i is outputted to the outside.

The signal converting part 170 is connected to the output terminal 143 of the signal amplifying part 140, and converts the analog output signal from the signal amplifying part 140 into a digital signal. The output value Vout outputted from the signal converting part 170 is a digital value of several bits for voltage corresponding to the drain current i.

Figure 4:
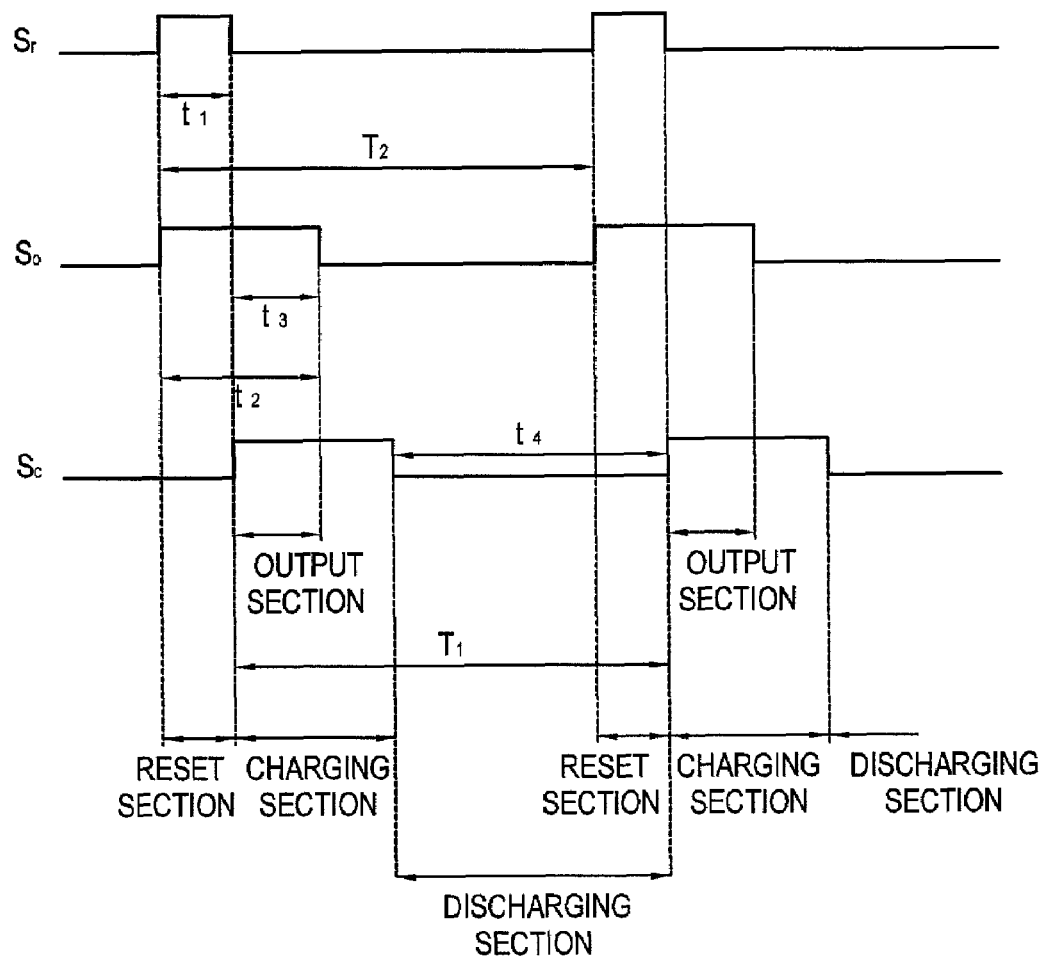
FIG. 4 is a timing diagram of switching parts of the light sensor in FIG. 3.

A process for obtaining an output value corresponding to the respective control signals Sc, Sr and So outputted to the respective switching parts 130, 150 and 160 from the controller 175 is described below with reference to FIG. 4.

The charging switching part 130 turns on and off per the first cycle T1; and the reset switching part 150 and the output switching part 160 turn on and off per the second cycle T2. In this embodiment, the first cycle T1 and the second cycle T2 are the same.

First, the reset switching part 150 and the output switching part 160 turn on simultaneously. For a first time period t1 during which the reset switching part 150 and the output switching part 160 are simultaneously turned on and the charging switching part 130 is turned off, the second capacitor C2 and the third capacitor C3 are initiated. Electric potentials of the first input terminal 141, the second input terminal 142 and the output terminal 143 of the signal amplifying part 140 become the reference voltage Vref. Accordingly, there is no voltage difference in the opposite terminals of the second capacitor C2; and the third capacitor C3 is charged with the reference voltage Vref.

Then, at the end of first time period t1, the reset switching part 150 is turned off; and the charging switching part 130 is turned on. As shown, the first time period t1 during which the reset switching part 150 is turned on is shorter than a second time period t2 during which the output switching part 160 is turned on.

A time difference between the first time period t1 and the second time period t2 or a third time period t3 during which the charging switching part 130 and the output switching part 160 are simultaneously turned on corresponds to a charging section in which the charging part 120 is charged and at the same time an output section in which an output value corresponding to current applied to the charging part 120 is outputted. The charging part 120 is charged with the reference voltage Vref of the signal amplifying part 140.

Then, the output switching part 160 and the charging switching part 130 are sequentially turned off. Electric charges charged in the charging part 120 are discharged for a fourth time period t4 during which the charging switching part 130 is turned off and flows in the direction of the drain current i of the light receiving transistor 110. The electric potential of the charging part 120 may decrease from the reference voltage Vref to a ground through the discharging. At this time, the drain current i varies according to the intensity of light, that is, increases according as the intensity of light increases.

Then, the above processes are repeated to measure the intensity of light through charging the discharged electric charges. That is, if the intensity of light increases, the amount of the discharged electric charges becomes large, and thus, the current consumed for the re-charging process increases. The drain current i can be measured by measuring the current consumed for the re-charging.

As described above, since the charging section and the output section are the same, electric charges are charged, and at the same time, the output value for the charged current is read. The fourth time period t4 during which electric charges are discharged is about 10-100 times longer than the third time period t3 during which electric charges are charged.

The output value Vout finally outputted corresponding to the intensity of light is approximately as follows:

$$Vout = Vref + I*t4/Cc + i*t3/C2$$

If the intensity of light is low, that is, in the case of low luminescence, the drain current i is very small and significantly affected by the electric charges discharged from the charging part 120 to the light receiving transistor 110. Thus, in the case of low luminescence, the output value Vout is dominantly affected by 'i*t4/Cc.' In other words, to obtain a stable and linear output in the low luminescence, the fourth time period t4 corresponding to the discharging section should be sufficiently long. The fourth time period t4 is approximately 10-100 ms.

Contrarily, if the intensity of light is high, that is, in the case of high luminescence, the drain current i is very large. Thus, if the charging switching part 130 is turned off, electric charges are all discharged to the light receiving transistor 110 for a very short time. Discharged electric charges are also charged for a very short time. If charging part 120 is completely charged, the output value maintains a constant level.

On the other hand, even if electric charges of the charging switching part 130 is completely discharged, the drain current i flows continuously, and thus, the drain current i should be supplied from the signal amplifying part 140. That is, the sum of current for charging the charging switching part 130 and current for compensating for the drain current i becomes the output value Vout, and the output value Vout is significantly affected by 'i*t3/C2' in the above equation.

As a result, in the case of high luminescence, it is possible to prevent a sudden rise of the output value Vout and obtain a linear output value Vout varying depending on the luminescence through the current for compensating for the drain current i, by employing the charging part 120 having a limited capacity.

Figure 5:
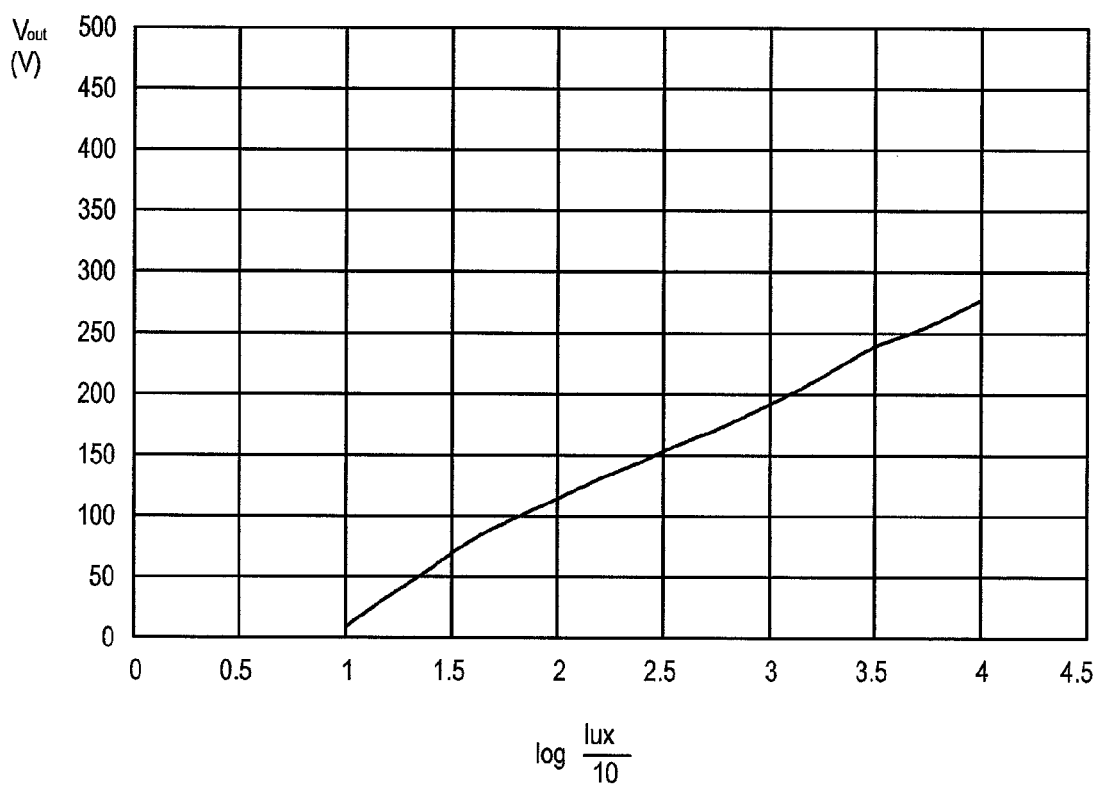
FIG. 5 is a graph showing an output value corresponding to luminescence in the light sensor according to the first exemplary embodiment of the present invention.

FIG. 5 is a graph showing an output value of the light sensor according to luminescence of light. Here, the x axis indicates a common logarithm (log lux/10) of the luminescence of light, the y axis indicates 8 bit digital value corresponding to the output value Vout. It can be seen that while the luminescence varies from 10 to 10,000 lux, the output value Vout maintains linearity. When the luminescence is 10 lux, the output value Vout is about 0; and when the luminescence is 10,000 lux, the output value Vout is little more than 250V.

Figure 6:
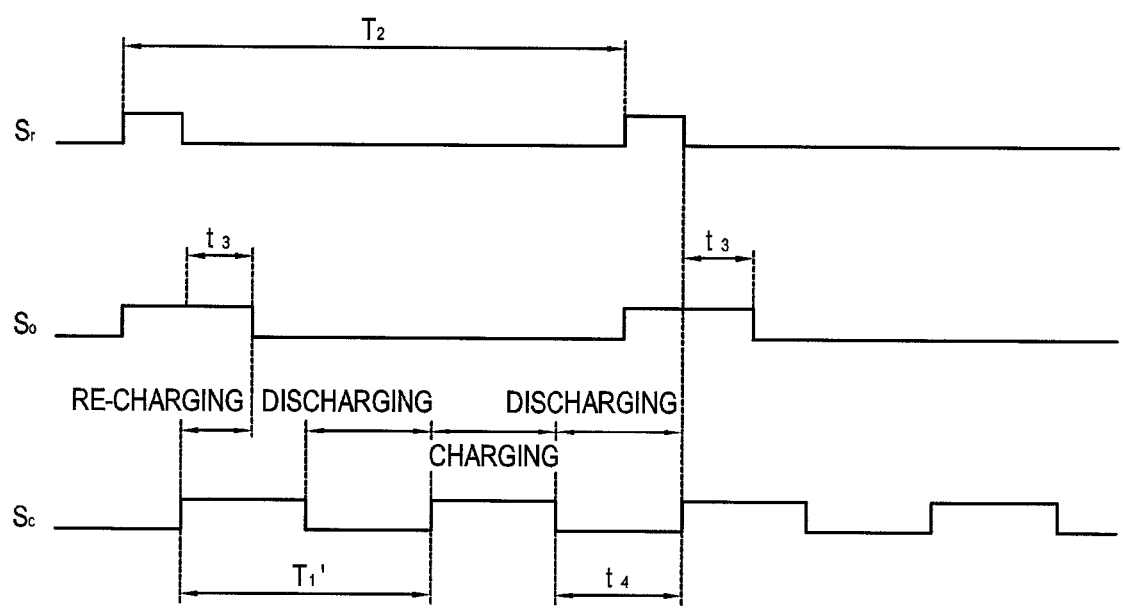
FIG. 6 is another timing diagram of the switching parts of the light sensor in FIG. 3.

FIG. 6 is another timing diagram with respect to the switching parts of the light sensor in FIG. 3. In this embodiment, a first cycle T1' during which the charging switching part 130 is switched on and off is shorter than the second cycle T2 during which the output switching part 160 is switched on and off. If a discharging time period t4 has a proper length for electric charges to sufficiently discharged before a time period t3, the output switching part 160 may have a turn-on time cycle different from the first cycle T1'. Every time when the output switching part 160 turns on, the signal converting part 170 converts an output signal into a digital signal, which causes power consumption. The power consumption by the signal converting part 170 is the largest compared with the other components of the light sensor 100. Thus, the switching cycle of the output switching part 160 for reading the output value may be set shorter than the turn-on cycle T1' of the charging switching part 130 to decrease power consumption.

Figure 7:
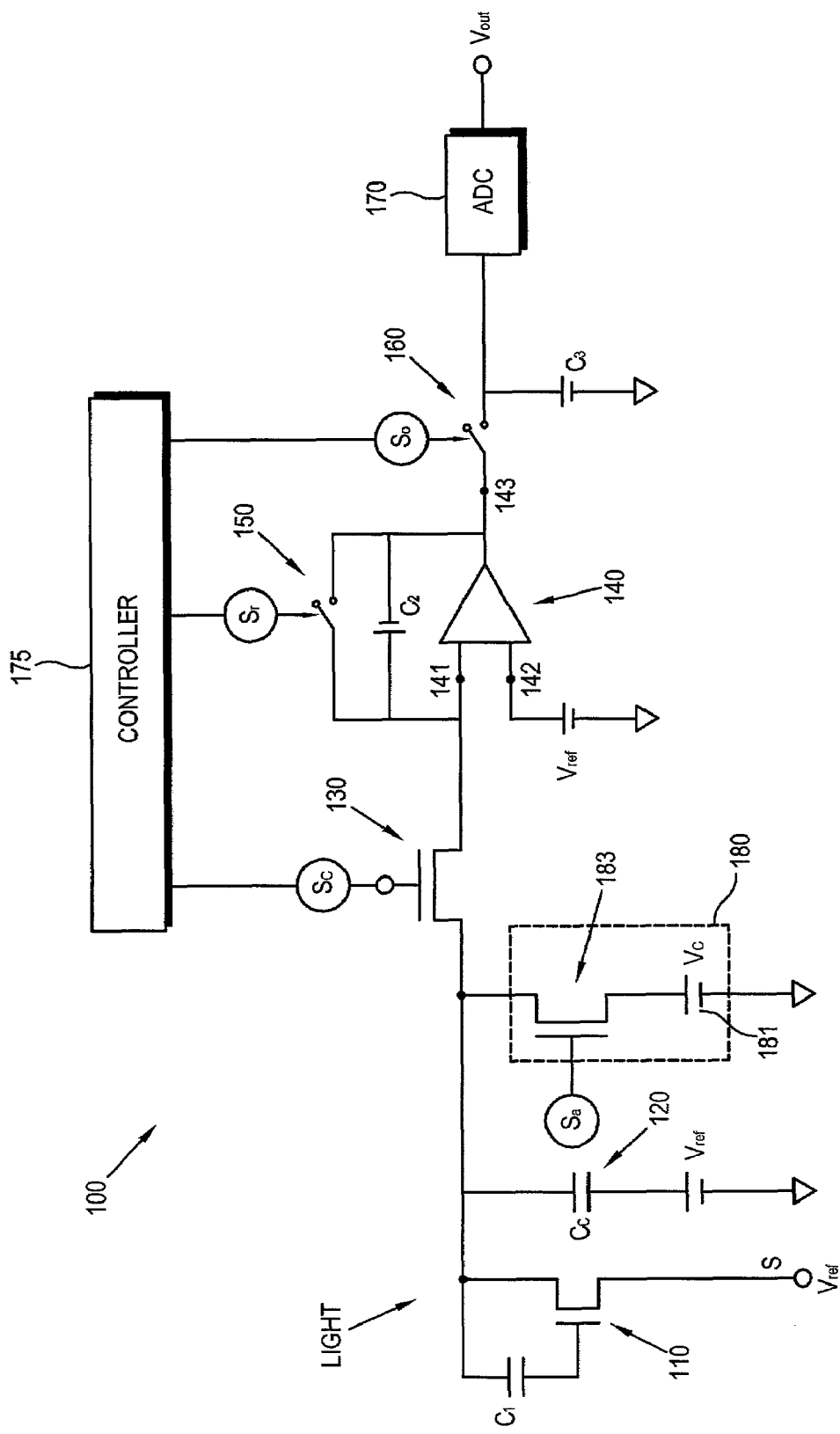
FIG. 7 is a circuit diagram of a light sensor according to a second exemplary embodiment of the present invention.
Figure 8:
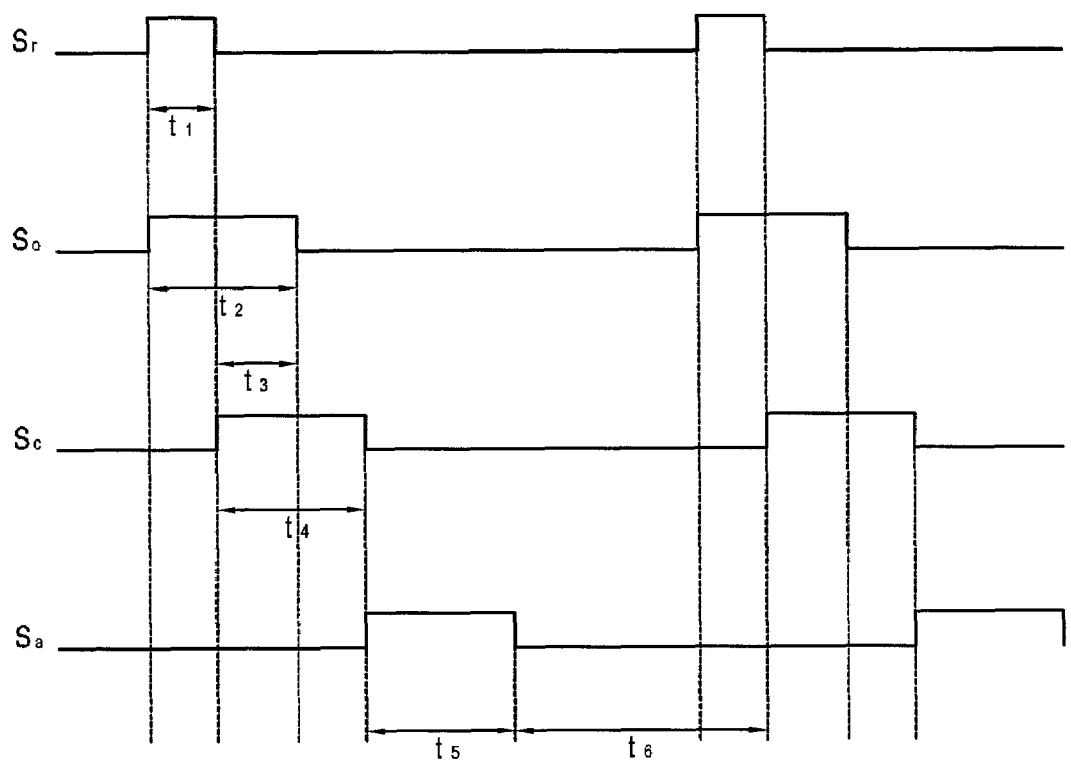
FIG. 8 is a timing diagram of switching parts of the light sensor in FIG. 7.

FIG. 7 is a circuit diagram of a light sensor according to a second embodiment of the present invention; and FIG. 8 is a timing diagram of switching parts of the light sensor in FIG. 7.

The light sensor according to the present embodiment may further include a charging voltage supplying part 180 for supplying a charging voltage Vc to the charging part 120. If the level of the charging voltage Vc supplied to the charging part 120 from the charging voltage supplying part 180 is larger than the reference voltage Vref, a direct current terminal of the charging part 120 functions as a direct current voltage source for providing the reference voltage Vref. In this case, the source electrode s of the light receiving transistor 110 is also connected to the reference voltage Vref. The level of the direct current voltage connected to the direct current terminal is not necessarily limited to the reference voltage Vref, and may be lower than the reference voltage Vref.

The charging voltage supplying part 180 includes a charging voltage source 181 which outputs the charging voltage Vc; and an auxiliary charging switching part 183 which has a first terminal connected to the charging voltage source 181 and a second terminal connected between the charging part 120 and the charging switching part 130. The controller 175 outputs an auxiliary charging control signal Sa to the auxiliary charging switching part 183; and then the auxiliary charging switching part 183 is turned on and off according to the auxiliary charging control signal Sa, as shown in FIG. 8.

The auxiliary charging switching part 183 may be turned on after the charging switching part 130 is turned off within the first cycle. The charging part 120 is charged for a fifth time period t5 during which the auxiliary charging switching part 183 is turned on. The charging part 120 is charged to the level of the charging voltage Vc; and then discharged for a sixth time period t6.

The discharged charging part 120 is re-charged for the time period t3 during which the charging switching part 130, the output switching part 160 are turned on and the auxiliary charging switching part 183 is turned off. The present embodiment is different from the embodiment in FIG. 3 in that charging and re-charging are separated.

Figure 9:
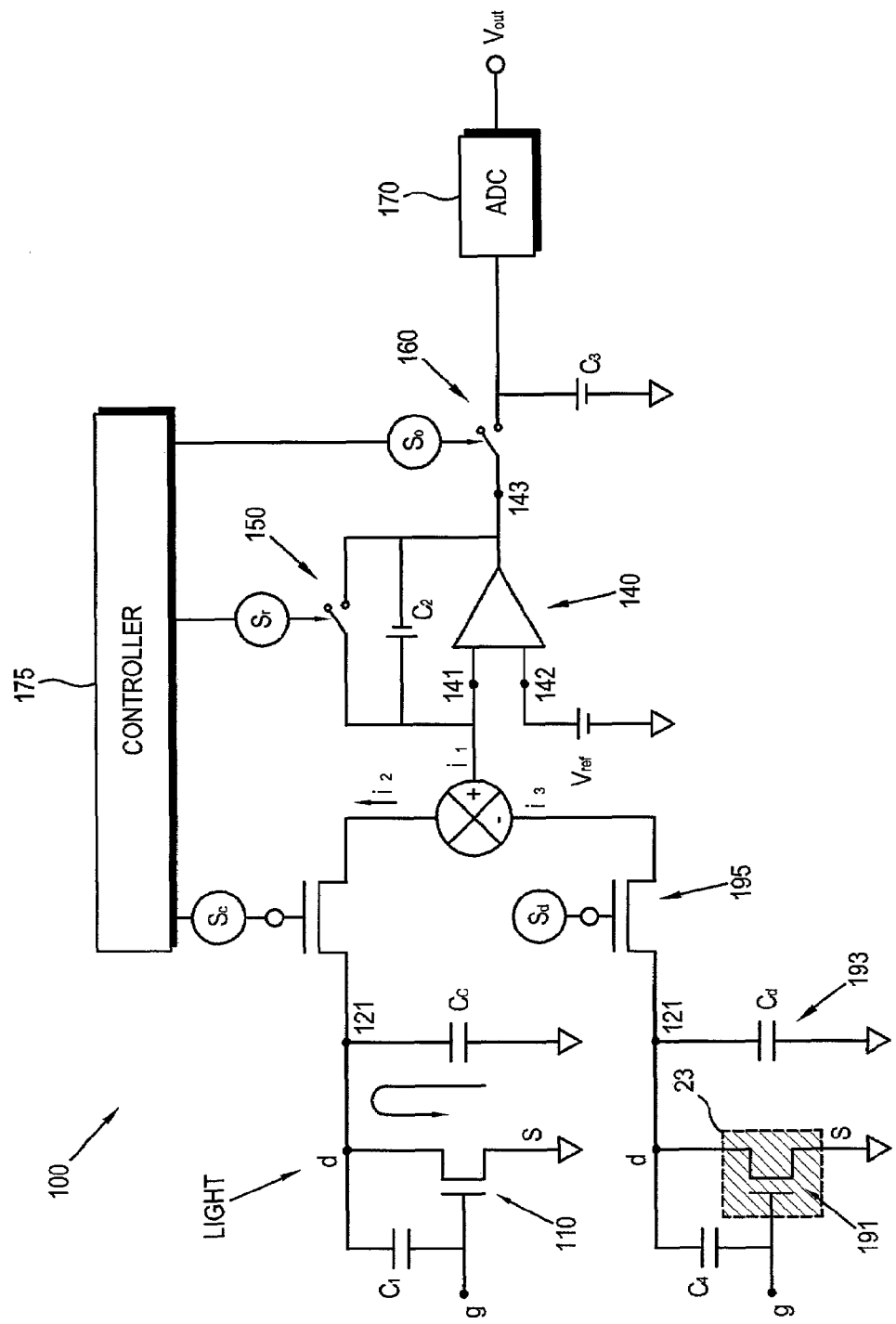
FIG. 9 is a circuit diagram of a light sensor according to a third exemplary embodiment of the present invention.

FIG. 9 is a circuit diagram illustrating a light sensor according to a third embodiment of the present invention.

The light sensor 100 according to the present embodiment includes a dummy transistor 191 which is formed below the light blocking layer 23; a dummy switching part 195 which is formed on a branch between the first input terminal 141 of the signal amplifying part 140 and the charging switching part 130; and a dummy charging part 193 which has a first terminal connected to a drain electrode d of the dummy transistor 191 and a second terminal connected to a direct current terminal. The light sensor 100 further includes an operation part 197 which is provided at a node connected to the charging switching part 130, the dummy switching part 195 and the first input terminal 141.

The light receiving transistor 110 may generate the drain current i according as an ambient temperature rises. In this embodiment, the dummy transistor 191 is provided below the light blocking layer 23 where light is not entered, to remove the affect of the drain current i generated in the output value Vout due to temperature.

When the drain current i is generated in the light receiving transistor 110 and the dummy transistor 191, current for charging flows to the light receiving transistor 110 and the dummy transistor 191 from the signal amplifying part 140. A total current i1 outputted from the signal amplifying part 140 corresponds to the sum of a current i2 inputted to the light receiving transistor 110 and a current i3 inputted to the dummy transistor 191. The operation part 197 operates a difference (i1−i3) between the current i1 outputted from the first input terminal 141 and the current i3 inputted to the dummy switching part 195. By operation of the operation part 197, the output value of the light sensor 100 is set to a value corresponding to the drain current i due to light from which the affect of temperature is removed.

Figure 10:
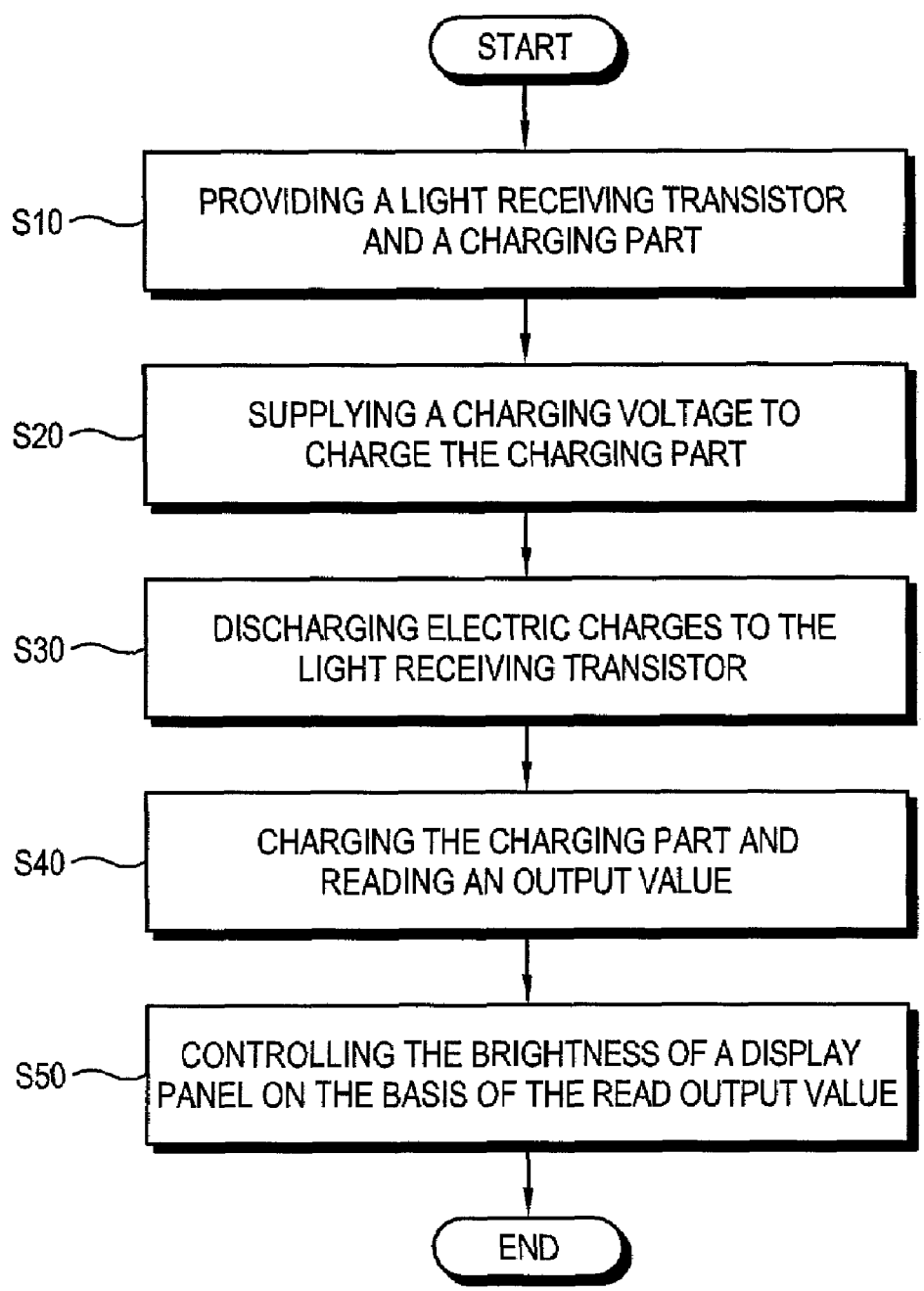
FIG. 10 is a control flowchart showing steps of a control method of a display apparatus according to an exemplary embodiment of the present invention.

Hereinafter, a control method of a display apparatus according to an exemplary embodiment of the present invention will be described with respect to FIG. 10.

First, there are provided the light receiving transistor 110 in which a voltage between the gate electrode g and the source electrode s is constant and the charging part 120 which has the first terminal connected to the drain electrode d of the light receiving transistor 110 and the second terminal 122 connected to a direct current terminal such as a ground terminal or a reference voltage (S10).

Then, a charging voltage is supplied to the extent that the charging part 120 is charged to a predetermined level (S20).

Then, the supply of the charging voltage is stopped for a predetermined discharging time so that electric charges of the charging part 120 are discharged to the light receiving transistor 110 (S30).

Thereafter, the charging part 120 is re-charged, an output value Vout corresponding to electric charges which are charged in the charging part 120, that is, a charging current is read (S40). At this time, the dummy transistor 191 may be formed below the light blocking layer 23 to remove the affect of temperature, and the operation for removing current outputted to the dummy transistor 191 may be performed.

Next, the brightness of the display panel 30 is controlled on the basis of the read output value (S50). To this end, the brightness of light provided from a back light unit may be controlled, or alternatively, a pixel voltage applied to pixels may be controlled.

As described above, according to the present invention, there are provided a light sensor which can provide a linear output in response to light, a display apparatus including the same, and a control method thereof.

Further, there are provided a light sensor which can obtain a stable output irrespective of change in characteristics of elements, a display apparatus including the same, and a control method thereof.

Furthermore, there are provided a light sensor which can obtain output in which the affect of temperature is removed, a display apparatus including the same, and a control method thereof.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What claimed is:

1. A light sensor for use in a display apparatus, the light sensor comprising:
   a light receiving transistor which receives outside light;
   a charging part which comprises a first terminal connected to a drain electrode of the light receiving transistor and a second terminal connected to a direct current terminal;
   a signal amplifying part which comprises a first input terminal and a second input terminal which is connected to a reference voltage supplying part;
   a charging switching part which is connected between the first input terminal and the first terminal of the charging part; and
   a controller which controls the charging switching part according to a predetermined first cycle to charge or discharge the charging part.

2. The light sensor according to claim 1, further comprising a reset switching part which comprises a first terminal connected to the first input terminal and a second terminal connected to an output terminal of the signal amplifying part,
   wherein the controller controls the reset switching part according to a predetermined second cycle.

3. The light sensor according to claim 2, further comprising an output switching part which is connected to the output terminal,
   wherein the controller controls the output switching part in synchronization with turn-on of the reset switching part, and a turn-on time during which the output switching part is turned on is longer than a turn-on time during which the reset switching part is turned on.

4. The light sensor according to claim 3, wherein the charging switching part is turned on after the reset switching part is turned off within the second cycle.

5. The light sensor according to claim 4, wherein a turn-on time during which the charging switching part and the output switching part are simultaneously turned on is shorter than a discharging time during which the charging switching part is turned off.

6. The light sensor according to claim 2, wherein the first cycle is the same as the second cycle.

7. The light sensor according to claim 2, wherein the first cycle is shorter than the second cycle.

8. The light sensor according to claim 1, wherein a voltage between a gate electrode and a source electrode of the light receiving transistor is maintained constantly.

9. The light sensor according to claim 1, wherein the direct current terminal comprises a ground terminal.

10. The light sensor according to claim 1, further comprising a charging voltage supplying part which supplies a charging voltage of a predetermined level to the charging part.

11. The light sensor according to claim 10, wherein if the level of the charging voltage is higher than that of the reference voltage, the direct current terminal comprises a direct current voltage source which outputs a voltage corresponding to the level of the reference voltage.

12. The light sensor according to claim 10, wherein the charging voltage supplying part comprises a charging voltage source which outputs the charging voltage; and an auxiliary charging switching part which comprises a first terminal connected to the charging voltage source and a second terminal connected between the charging part and the charging switching part.

13. The light sensor according to claim 12, wherein the auxiliary charging switching part is turned on after the charging switching part turned off within the first cycle.

14. The light sensor according to claim 1, further comprising a signal converting part which is connected to the output terminal of the signal amplifying part and converts an output signal outputted from the signal amplifying part into a digital signal.

15. A display apparatus comprising:
a display panel which comprises a display area through which an image is displayed and a non-display area through which the image is not displayed;
a light receiving transistor which is formed in the non-display area and receives outside light;
a charging part which comprises a first terminal connected to a drain electrode of the light receiving part and a second terminal connected to a direct current terminal;
a signal amplifying part which comprises a first terminal and a second terminal which is connected to a reference voltage supplying part and receives a reference voltage;
a charging switching part which is connected between the first input terminal and the first terminal of the charging part; and
a controller which controls the charging switching part according to a predetermined first cycle to charge or discharge the charging part.

16. The display apparatus according to claim 15, wherein the charging switching part is formed on the display panel.

17. The display apparatus according to claim 15, wherein the display panel comprises a first substrate, a second substrate which faces the first substrate, and a light blocking layer which is formed on at least one of the first substrate and the second substrate and blocks the outside light,
the display apparatus further comprising: a dummy switching part which is formed on a branch between the first input terminal and the charging switching part; a dummy transistor which is formed below the light blocking layer and comprises a drain electrode connected to the dummy switching part; and a dummy charging part which comprises a first terminal connected to the drain electrode of the dummy transistor and a second terminal connected to a direct current terminal.

18. The display apparatus according to claim 17, further comprising an operation part which is provided at a node connected to the charging switching part, the dummy switching part and the first input terminal, and operates a difference between current outputted from the first input terminal and current inputted to the dummy switching part.

19. A control method of a display apparatus which comprises a display panel, comprising:
providing a light receiving transistor in which a voltage between a gate electrode and a source electrode is constant and a charging part which comprises a first terminal connected to a drain electrode of the light receiving transistor and a second terminal connected to a direct current terminal;
supplying a predetermined charging voltage to charge the charging part;
stopping the charging voltage supplying for a predetermined time so that electric charges in the charging part are discharged to the light receiving transistor;
reading an output value corresponding to electric charges charged in the charging part while charging the charging part; and
controlling the brightness of the display panel on the basis of the read output value.

* * * * *